Jan. 15, 1952     L. A. MEKLER     2,582,877
VALVE CLOSURE
Filed July 2, 1948
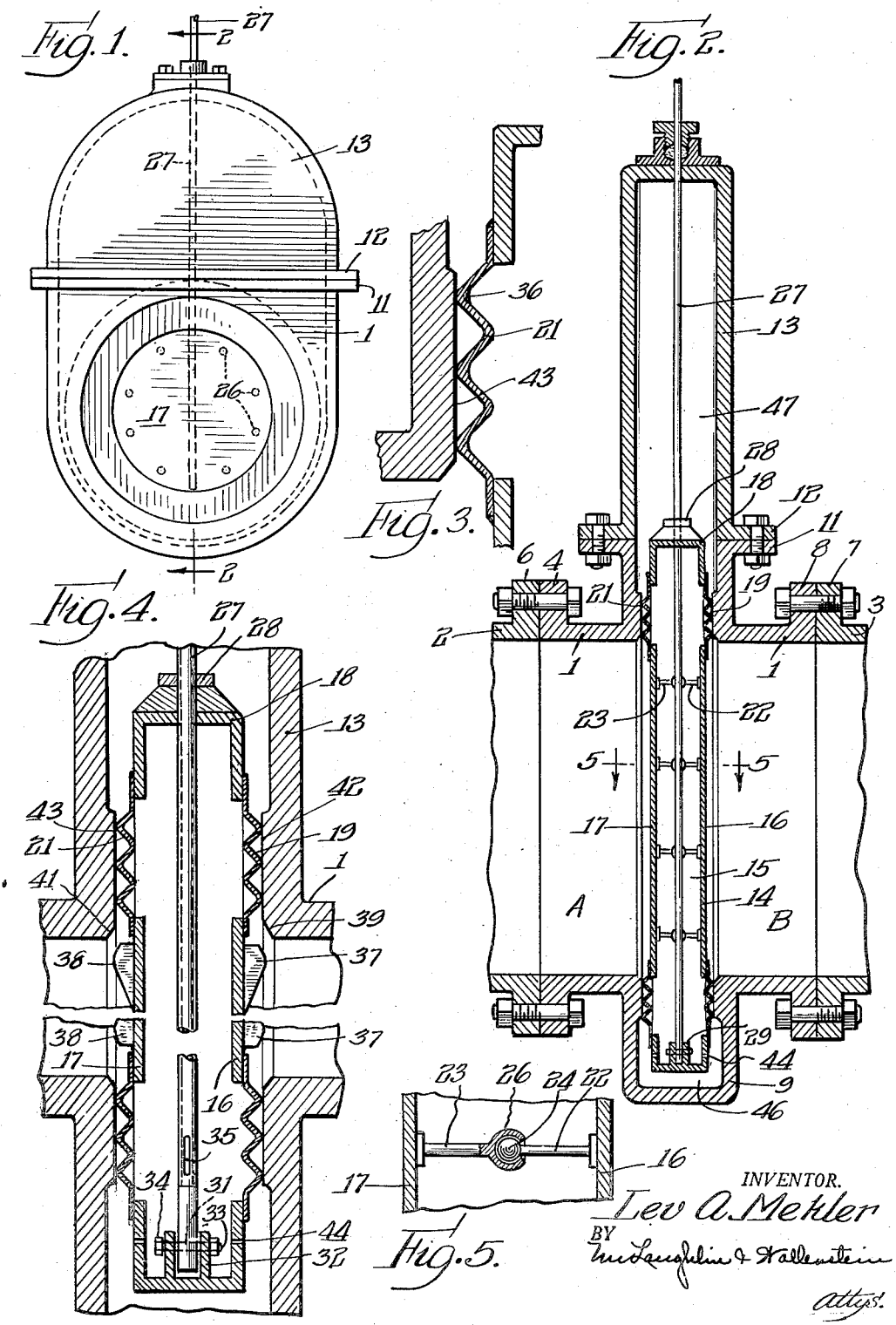
INVENTOR.
Lev A. Mekler
BY McLaughlin & Wallenstein
attys.

Patented Jan. 15, 1952

2,582,877

UNITED STATES PATENT OFFICE 2,582,877

VALVE CLOSURE

Lev A. Mekler, Chicago, Ill.

Application July 2, 1948, Serial No. 36,617

3 Claims. (Cl. 251—65)

My invention relates to improvements in valves and is directed particularly to valves of the gate-type and which are intended for use in situations where the valve closure is normally subject to a substantial differential expansion of the opposite sides or faces thereof due to differences of temperature to which said opposite sides or faces are subjected in use. Valves made in accordance with my present invention find particular utility as hot reversing valves in equipment used in cyclic processes as, for example, the catalytic treatment of hydrocarbon liquids and gases, the manufacture of gas in gas generators, and the like.

In valve structures heretofore employed for high temperature use, and particularly where there is a substantial temperature differential on opposite sides of the valve closure, serious problems have arisen. In the first place, in order to obtain a fluid- or liquid-tight closure, it has been necessary to resort to expensive operations such as grinding, lapping-in, and the like in order to obtain an accurate fit between the contacting surfaces of the valve closure and valve body. However, even when the valves are properly constructed initially, the use thereof under severe temperature conditions causes warping in due time because of undue thermal stresses, and the usefulness of the valve is destroyed.

In accordance with my present invention, a novel valve structure has been evolved which is relatively inexpensive to construct, has long life, is simple to operate, and is highly effective, particularly for use under temperature conditions of the character referred to above.

My invention will be best understood in connection with the accompanying drawings wherein a preferred embodiment of my novel valve structure is disclosed and wherein Fig. 1 is a front elevation;

Fig. 2 is a vertical section taken along the line 2—2 of Fig. 1;

Fig. 3 is an enlarged sectional view showing in greater detail the construction of the corrugated members which form a part of the valve closure assembly proper;

Fig. 4 is an enlarged sectional view, partly broken away, showing in somewhat greater detail the structure shown in Fig. 2; and Fig. 5 is a horizontal section taken along line 5—5 of Fig. 2.

Referring to the drawings, and more particularly to Figs. 2 and 4, the valve structure comprises a rigid valve body or casing 1 which connects to conduits 2 and 3, defining zones A and B, through flanged members 4, 6, 7 and 8. The valve body or casing 1 is of generally conventional design and may be similar to that used in blast gates, gate valves, and the like. The lower part of the casing 1 is arranged to form a well 9 for the reception of the lower part of the valve closure member when said member is in closed position. The upper part of the casing 1 is connected through flanged members 11 and 12 to a bonnet 13.

The valve closure member 14 comprises an expandable hollow chamber structure 15 which is formed by spaced opposed generally circular or, if desired, somewhat oval-shaped, rigid plates 16 and 17, an annular rigid rim 18, and flexible annular ring members, particularly in the form of corrugated bodies 19 and 21. The flexible corrugated annular ring members are connected or joined along their edges to the rigid plates 16 and 17 and to the rigid rim 18 in fluid-tight relationship. This is suitably accomplished by welding said ring members 19 and 21 at their inner peripheries to said rigid plates 16 and 17, respectively, and at their outer peripheries to said rim 18. The plates 16 and 17 are held together in the assembly by any suitable means which, preferably, permit a slight amount of movement between said plates towards and away from each other. One satisfactory manner of accomplishing this result is shown more particularly in Fig. 5 and comprises radially disposed bolt-like members 22 and 23. The members 22 are fixed firmly to the plate 16 and the members 23 are firmly fixed to the plate 17. The ends of the members 22 are formed with knob-like or somewhat spherical enlargements 24 which fit somewhat loosely into the enlarged sockets 26 formed on the ends of the opposed members 23.

A hollow operating stem or rod 27, connected preferably to the upper part 28 of the rim 18 by welding or the like, and to the lower part 29 of the rim 18, in an articulated manner to provide limited vertical motion to relieve strain on the members 19 and 21, serves to raise and lower the closure member in order to open or close the valve as desired. As shown more particularly in Fig. 4, the connection of the hollow rod 27 to the lower part 29 of the rim 18 may be effected through an apertured enlargement 31 on the rod which fits between upstanding apertured lugs 32 with a bolt 33 passing through the apertures in the enlargement 31 and lugs 32 and held in assembled relationship by the nuts 34. The aperture in the enlargement 31 is somewhat larger in diameter than the bolt 33 to provide for free play in a vertical direction. The purpose of this construction is to relieve strain on the corrugated members 19 and 21 when they are under expansion due to fluid pressure within the chamber 15. The rod 27 is provided with elongated slots or apertures 35 through which a fluid may be admitted into the chamber 15 from the rod 27.

To insure long wear, the corrugated members 19 and 21, although preferably made of a tough metal such as an alloy steel, are additionally formed with thickened portions 36 at their outward involutions or, in other words, at those parts wherein rubbing or friction takes place in the operation of the valve.

As more particularly shown in Fig. 4, the plates 16 and 17 are provided with lug or projection members 37 and 38 having rounded or curved surfaces, and it will also be observed that the corners 39 and 41 of the casing 1 are cut away or rounded. This construction insures smooth operation of the valve, the members 37 and 38 bearing against the seating surfaces 42 and 43 and sliding smoothly therealong when the valve stem 27 is raised to open the valve and the corrugated members 19 and 21 pass out of contact with the seating surfaces 42 and 43.

I find it advantageous, in certain instances, to provide weep or purge holes 44 in the lower part of the rim 18, one or a plurality of such holes of small diameter being provided, for the purposes stated hereinafter.

In the operation of the valve, assuming it to be in closed position as shown in Fig. 2, a hydraulic fluid, which may take the form of a liquid or a vapor or gas, for example, water or steam, is admitted under pressure from a suitable source (not shown) through the apertures 35 of the hollow stem 27 into the chamber 15 of the closure formed by the plates 16 and 17, the rim 18 and the flexible members 19 and 21. The pressure built up in said chamber exerts itself to force the corrugated flexible members 19 and 21 into firm and intimate engagement with the seating surfaces 42 and 43 to make a tight closure. Since the rigid plates 16 and 17 have only a slight and limited relative movement toward and away from each other, the chief effect of the pressure built up in the chamber 15 is exerted to cause the corrugated flexible members to deform or expand until they make a tight and intimate contact with the seating surfaces 42 and 43.

When it is desired to open the valve, the internal pressure within the chamber is released by withdrawing the liquid or vapor or gas, as the case may be, through the hollow stem 27. This "collapses" the valve closure, making withdrawal simple when the stem 27 is raised to open the valve. If desired, the chamber 15 may be evacuated through the hollow stem 27, thereby further "collapsing" the valve closure and facilitating withdrawal when the stem 27 is raised.

When the valve of my present invention is used in certain systems wherein hydrocarbons are treated or handled, there is a tendency to deposit solids, such as tars or gums, on the valve closure and on the valve seats. The utilization of the weep or purge holes 44 serves to reduce or eliminate such deposits. This is accomplished by the fact that a very small amount of the fluid which is in the chamber 15 under substantial pressure passes through the purge holes 44 into the spaces 46 and 47 and builds up a fluid pressure in said spaces. The pressure in spaces 46 and 47 being higher than that in zones A and B, the fluid has a tendency to leak past the corrugated members 19 and 21 into the conduits and, in so doing, it prevents or reduces the deposition of any solids between the valve closure and the valve seats 42 and 43. Furthermore, when the closure is "collapsed" preparatory to opening the valve, the pressure built up in the spaces 46 and 47 becomes released suddenly with the result that the swift movement of the fluid past the valve seating surfaces facilitates removal of any deposits which may possibly have formed thereon. It will be understood, of course, that, where the purge holes are utilized, the fluid used to effect expansion of the valve closure member and to function as the purging fluid should not be of such a nature that it will react in an undesirable manner with the materials which pass through the valve from one conduit to the other in the particular operation or process involved. It will also be appreciated that, for high temperature applications, the fluid selected should be one which will not decompose under the temperatures encountered. As I have indicated above, steam is quite suitable in many applications. In certain special cases, as, for example, where my valve is used as a hot valve in a gas generator, the gas itself may be used as the valve operating pressure fluid.

In many instances, the fluid serves not only as an expanding medium to effect tight seating of the valve closure member but, in addition, it functions as a cooling medium for said closure member, particularly for the plates or discs 16 and 17, serving to equalize somewhat the temperature of said plates if they are subjected to different temperatures in the zones A and B. Thus, for example, if the temperature in zone A is 1400–1600 degrees F. and in zone B is 600 degrees F., as may be the case in a portion of the cycle in a regenerator of an oil gas generating set, and with static pressure in the zones being 5" W. G. and 40" W. G., respectively, exhaust saturated steam at a pressure of 6 pounds per square inch can be used as both an expanding and cooling medium. By regulating the quantity of steam permitted to escape through the purge holes, both plates 16 and 17 may be maintained at close to the same temperature intermediate 600 and 1400 degrees F.

What I claim as new and desire to protect by Letters Patent of the United States is:

1. A valve comprising a rigid casing forming a valve body provided with opposed annular seats, and a generally hollow closure member adapted to be mounted in said casing and provided with flexible means adapted, in expanded position, to seal tightly against said seat, said closure comprising spaced, opposed generally circular, rigid plates connected together through articulated means whereby to permit limited relative movement between said plates, an annular rigid rim, and corrugated, flexible annular ring members connected at their inner peripheries to said rigid plates and at their outer peripheries to said rim in fluid-tight relationship, a hollow rod connected to said rigid rims to move the closure member into open or closed position as desired, means for introducing a fluid under pressure through said hollow rod and into said hollow closure member to cause said corrugated ring members to expand and seat tightly against said annular seats, and aperture means in the rims through which fluid from the interior of said closure member may pass into the space between the valve body and the closure to remove any deposits between the closure and the annular seats.

2. A valve comprising a rigid casing, valve seating means, an expandable hollow closure member formed by a generally annular rigid rim, rigid opposed central plate members, and flexible annular rings connected between the central plate members and the rigid rim in essentially fluid-tight relationship, means for admitting a fluid under pressure into said hollow closure member whereby said flexible annular rings expand to seat tightly against said seating means without appreciably altering the shape of the rim and the shape and relative position of the central plate members, and a rod connected to the upper and lower parts of said rigid rim to move the closure member into open or closed position as desired, one of said connections being rigid and the other allowing slight vertical relative movement between said rod and its connection to said rim to relieve undue strain on said flexible annular rings.

3. A valve comprising a rigid casing forming a valve body provided with opposed annular seats, and a generally hollow closure member adapted to be mounted in said casing and provided with flexible means adapted, in expanded position, to seal tightly against said seats, said closure comprising spaced opposed generally circular, rigid plates connected together to permit limited relative movement between said plates, an annular rigid rim, said flexible means comprising corrugated annular ring members connected at their inner peripheries to said rigid plates and at their outer peripheries to said rim in fluid-tight relationship, a hollow rod connected to the upper and lower parts of said rigid rim to move the closure member into open or closed position as desired, the connection of said hollow rod being fixed at the upper part of said rigid rim and the connection of said hollow rod at the lower part of said rigid rim allowing slight vertical relative movement between said rod and its lower connection to said rigid rim to relieve undue strain on said corrugated ring members, and means for introducing a fluid under pressure into said hollow closure member through said hollow rod to cause said corrugated ring members to expand and seat tightly against said annular seats.

LEV A. MEKLER.

REFERENCES CITED

The following references are of record in the file of this patent:

UNITED STATES PATENTS

| Number | Name | Date |
|---|---|---|
| 646,104 | Faber | Mar. 27, 1900 |
| 686,703 | Bickford | Nov. 19, 1901 |
| 715,745 | Bickford | Dec. 16, 1902 |
| 1,476,344 | McGee | Dec. 4, 1923 |
| 1,957,807 | Robinson | May 8, 1934 |